UNITED STATES PATENT OFFICE.

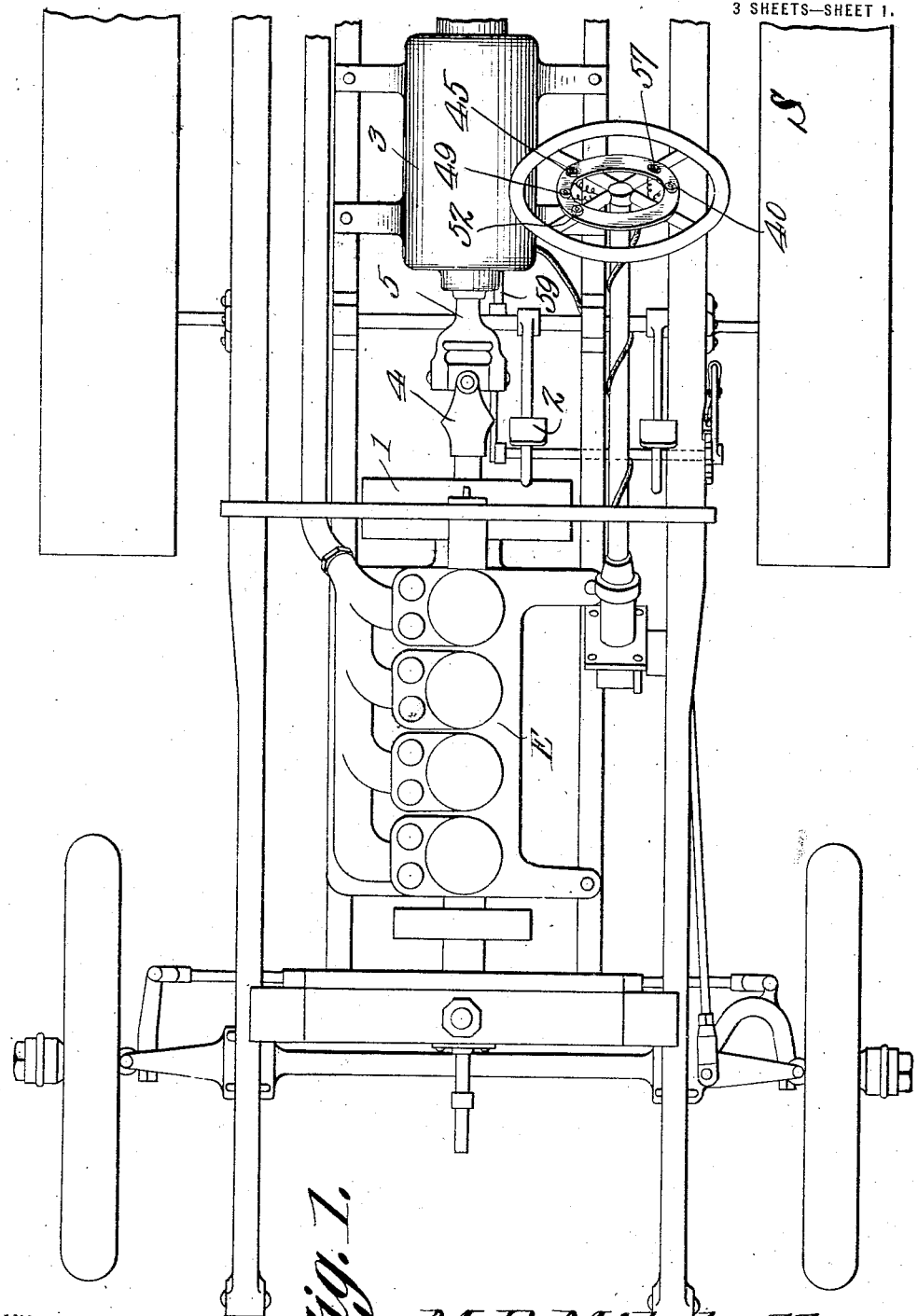

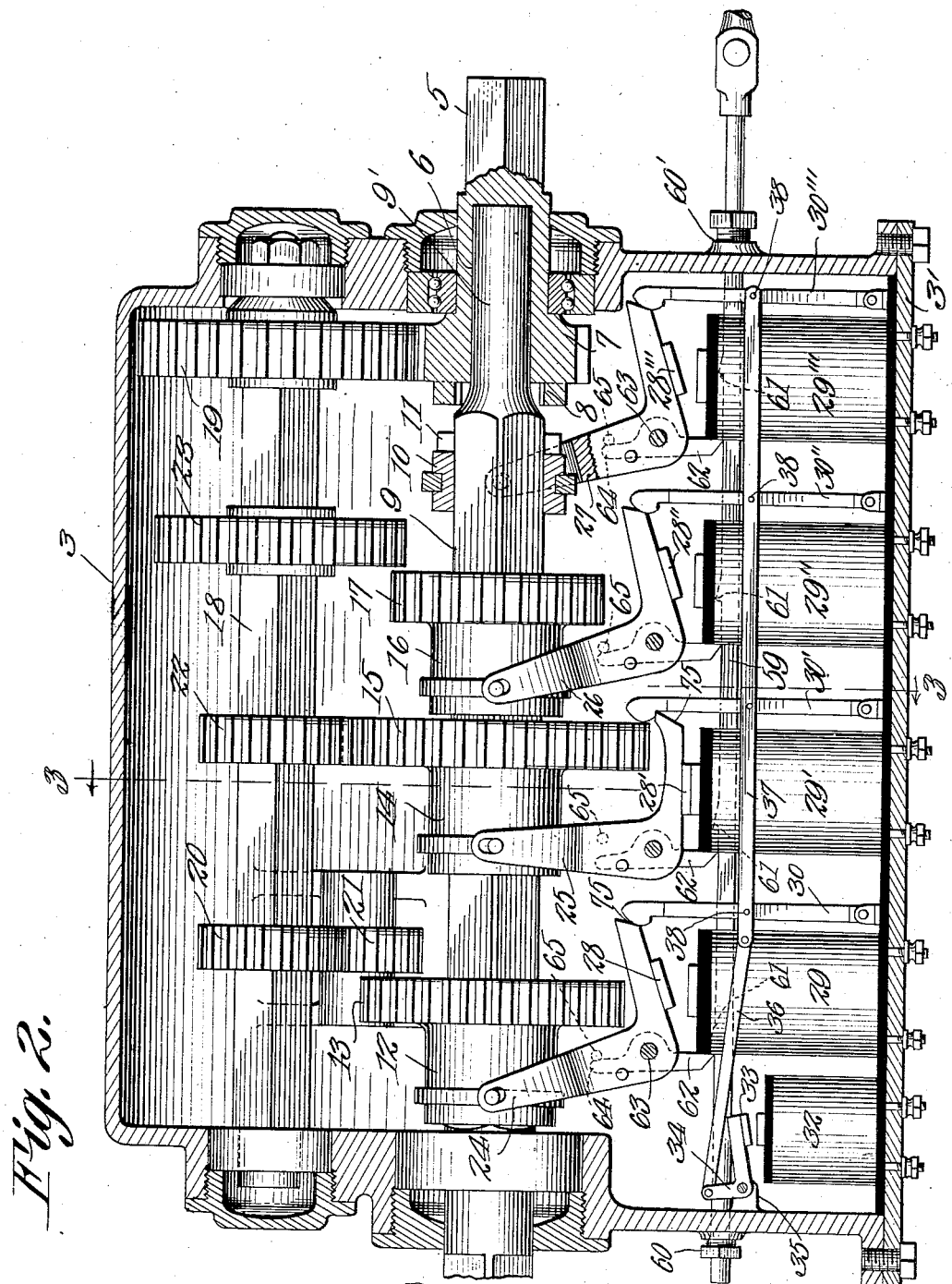

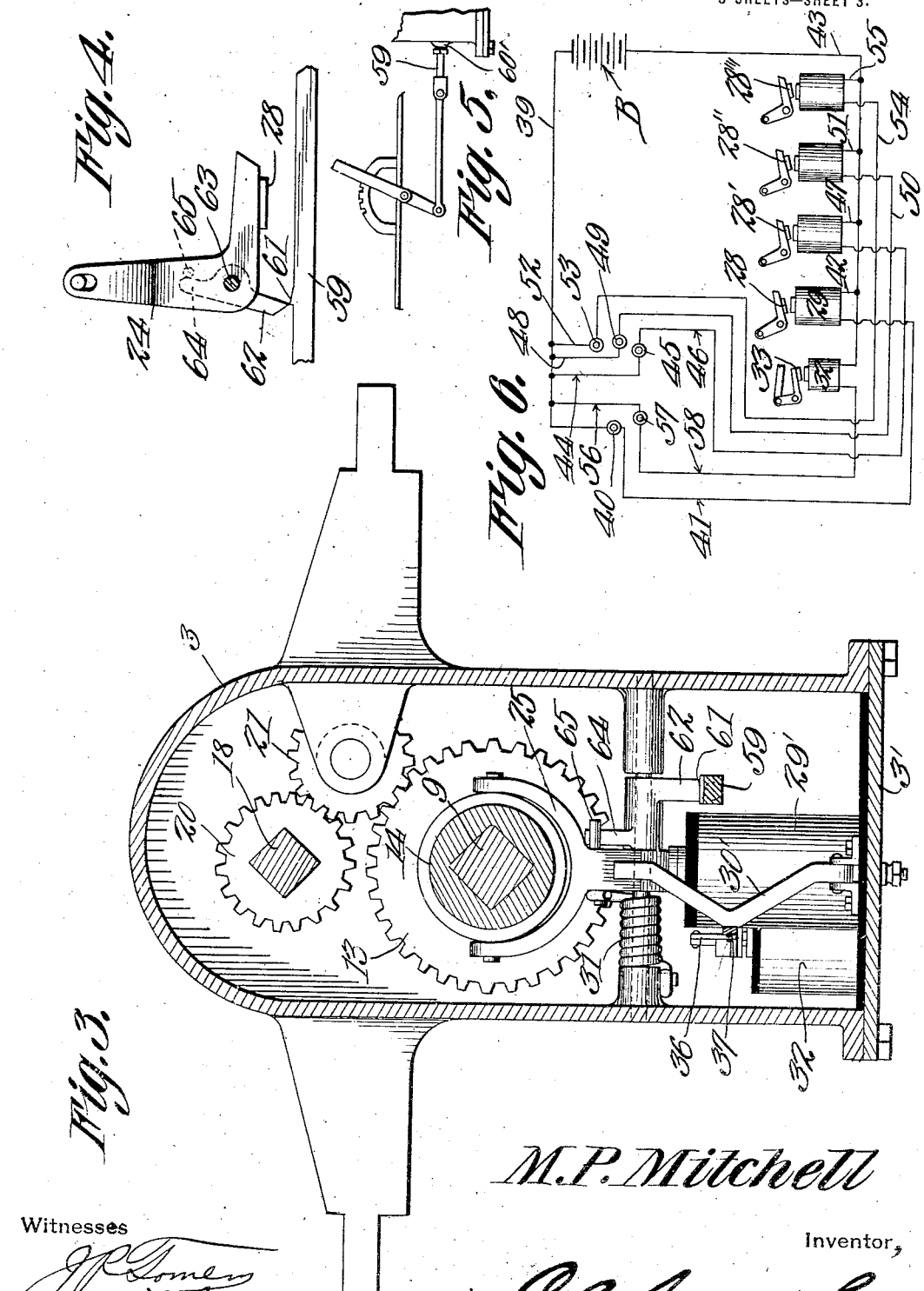

MARY PIERSON MITCHELL, OF EATON, OHIO.

TRANSMISSION MECHANISM.

1,171,868.

Specification of Letters Patent.   Patented Feb. 15, 1916.

Application filed July 8, 1914. Serial No. 849,815.

*To all whom it may concern:*

Be it known that I, MARY P. MITCHELL, a citizen of the United States, residing at Eaton, in the county of Preble and State of Ohio, have invented a new and useful Transmission Mechanism, of which the following is a specification.

The present invention relates to improvements in transmission mechanisms, and more particularly to transmission mechanisms adapted to be used in transmitting power from an explosion engine in an automobile to the driven member or rear axle thereof, one object of the invention being the provision of a transmission mechanism in which electrically operated means are provided for controlling the low, intermediate and full speed or direct drive and reverse thereof, the same being under the control of push buttons or switches operably connected to the steering wheel of the automobile, thus dispensing with the use of levers except as an auxiliary means in case of a failure of the electrical circuit.

A further object of the present invention, is the provision of a mechanically or manually operated means whereby the various parts of the transmission may be selected manually by controlling the same mechanism that is operated electrically, thus providing two means whereby the transmission mechanism is controlled.

A still further object of the present invention is the provision of a transmission mechanism, in which the various clutches are thrown either mechanically or electrically, and by means of which one is released before the next is placed in operation and when the device is operated to neutral any one that happens to be connected will be disconnected.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view in plan and partly in diagram showing the present invention applied to an automobile. Fig. 2 is a vertical longitudinal sectional view through the present transmission mechanism showing the low gear in mesh. Fig. 3 is a section taken on line 3—3 of Fig. 2. Fig. 4 is an enlarged detail view showing the means for manually selecting the clutches. Fig. 5 is a reduced detail view showing the manually controlled lever connected for operating the manually controlled device. Fig. 6 is a diagrammatic view of the electrical circuit for operating the electromagnets of the present device.

Referring to the drawings, E designates the explosion engine, which is of the type usually used in motor cars, the same being provided with the fly wheeled clutch 1 controlled by the foot lever 2 of usual construction, a short shaft 4 being connected by a flexible connection to the stub shaft 5 of the present transmission, said shaft 5 being properly journaled within one end of the transmission casing 3, which is provided with the removable bottom 3'.

The short shaft 5, as clearly illustrated in Fig. 2, is provided with the cylindrical socket 6 for the reception of the reduced end 9' of the main shaft 9 of the transmission mechanism. Formed integral with the shaft 5 within the casing 3 is the pinion 7, which also has formed integral therewith, the clutch member 8, which is adapted to coöperate with the clutch 11 of the slidably mounted clutch carrying member or sleeve 10 which is mounted upon the shaft 9. the detailed operation of which will be set forth later on. Mounted for sliding movement upon the shaft 9 at equidistant points within the said casing 3 is the sleeve 12 which carries the gear 13, the sleeve 14 which carries the gear 15, and the sleeve 16 which carries the gear 17. The gear 13 forms a gear for the reverse control of the present mechanism, the gear 15 forming the low speed mechanism, while the gear 17 forms the intermediate speed, the clutch members 8 and 11 constituting the direct drive, by means of which the shaft 9 is connected directly to the shaft 5 and consequently operated at the speed of the engine. Journaled within the casing and parallel to the shaft 9 is the counter shaft 18, which is provided with the large gear 19 which is in mesh with the gear 7 by means of which the counter shaft is rotated from the short shaft 5 to operate the shaft 9 at the various intermediate, low and reverse speeds. Keyed upon the shaft 18 are the respective pinions 20, 22 and 23, the pinion 20 being in mesh with the pinion 21 which when the pinion 13 is in engagement with the pinion 21 transmits reverse movement to the shaft 9, through the pinions 7 and 19.

In the present instance, four yokes made in the shape of bell crank levers 24, 25, 26 and 27 are employed for operating the various sleeves 12, 14, 15 and 16 which are moved longitudinally of the shaft 9 to cause the proper selection for the shaft 9 to be rotated either directly from the engine shaft through the short shaft 5 or through the shaft 18.

Each bell crank lever is provided with an armature, which is clearly shown at 28, 28', 28'', and 28'''. Mounted upon the removable cover or bottom 3' of the casing 3, are the four electromagnets 29, 29', 29'' and 29''', each one being disposed to attract its respective armature above referred to, so that the respective bell crank lever will be operated when its respective electromagnet is energized to cause the proper selection of the gears to perform the desired operation.

In order to lock the respective bell crank levers so that the same will be held in proper position and against the natural action of the springs 31 to hold the sleeves 12, 14, 16 and 10 to the extreme left position as would be the natural tendency in Fig. 2, a plurality of catches 30, 30', 30'' and 30''' are pivoted to the closure 3' and have their free ends disposed to ride upon and engage one of the terminals of its respective bell crank lever to hold the same locked as illustrated by the position of the bell crank lever 25 which is held in locked position with the gear 15 meshing with the gear 22, the mechanism as illustrated in Fig. 2 being in the position it assumes when the transmission mechanism is transmitting low speed to the driven element. One of the coiled torsional springs 31 is mounted upon the fulcrum member of each bell crank lever, and one end of each spring is connected to the casing, while the other end is connected to the respective bell crank lever, so that the spring will swing the bell crank lever to normal position.

In order to provide a means for releasing the latches or catches 30, 30', 30'' and 30''', so as to return all of the respective transmission mechanisms to neutral position, the neutral electromagnet 32 is employed and is carried by the bottom or removable cover 3', the same being disposed in attractive relation to the armature 33 which is carried by the bell crank lever 34 pivoted in the bracket 35 of the casing 3. Connected to the bell crank lever 34 is a link 36, which in turn is operably connected to the rod 37. The rod 37 by means of the respective pins 38, four being here shown, is properly connected to all of the catches so that when the electromagnet 32 is energized, the bell crank lever 34 will be operated to push the bar 37 to the right and thus release the free ends of the respective catches from their respective yokes 24, 25, 26 or 27, it being impossible to have more than one in engagement at a time, for the reason that the inclined face 75 of the respective bell crank levers in their movement downwardly due to the energization of the respective electromagnets will engage the free end of its respective catch 30, 30', 30'' or 30''' and as the same is connected to the bar 37 will move such bar to the right and thus release any of the respective catches that may be caught for holding an armature controlled bell crank lever so that the member connected thereto will be released by action of the spring 31 and the previously selected transmission member will return to normal position before the then operating bell crank lever is locked.

The electrical installation for controlling the operation of the electro-magnets heretofore referred to, is shown in Fig. 6, there being used a single source of electrical energy or battery B for the proper operation of the present system. This source of electrical energy may be a generator or a motor-generator or battery, as may be found desirable.

The circuit for operating the electromagnet 29, which is the reverse speed controlling means, includes the battery B, the conductor 39, a switch 40, the conductor 41, the electromagnet 29, and the conductors 42 and 43.

The circuit for controlling the low speed control electromagnet 29', includes the battery B, the conductor 39, the conductor 44, the switch or push button 45, the conductor 46, the electromagnet 29' and the conductors 47 and 43.

The circuit for controlling the intermediate speed electromagnet 29'', includes the battery B, the conductor 39, the conductor 48, the switch or push button 49, the conductor 50, the electromagnet 29'' and the conductors 51 and 43.

The circuit for controlling the direct connecting electromagnet 29''', includes the battery B, the conductor 39, the conductors 39 and 52, the push button or switch 53, the conductor 54, the electromagnet 29''', and the conductors 55 and 43.

In order to control the neutral electromagnet 32, the circuit includes the battery B, the conductor 39, the conductor 56, the push button or switch 57, the conductor 58, the electromagnet 32 and the conductor 43.

All of the respective buttons or switches, as illustrated in diagram in Fig. 6, are carried by the steering wheels S, as clearly illustrated in Fig. 1, and thus are in ready access to the driver or chauffeur so that the various clutches and change mechanisms for a clutch may be controlled by merely pressing a button or buttons.

In order to provide a mechanical operating means for progressively operating the various members of the present transmission, a horizontally slidable or reciprocatory rod 59 is slidably mounted in the stuffing boxes 60 and 60' of the casing 3 at the opposite side of the various electromagnets to the rod 37, the same being provided with a plurality of inclined abutments 61, four in number being shown, one to each of the respective bell crank levers, 24, 25, 26 and 27, and each being so spaced, that only one will be operated at a time and such one will be operated only after the release of the one previously selected. In order to accomplish this, the actuating lugs 62, one to each of the respective bell crank levers is pivoted at 63 adjacent to its respective bell crank and is disposed in the path to be engaged by its respective abutment or projection 61 as the bar or rod 59 is moved to the left as viewed in Fig. 2, the same having its upper end 64 disposed to engage the pin 65 carried by the respective bell crank lever so as to operate the bell crank lever upon its mounting shaft 63 in opposition to its spring 31 and thus pull in the respective member controlled thereby as for instance when the rod 59 is moved to the left as shown in Fig. 2, the abutment 61 will first operate the lug 62 of the bell crank lever or armature member 24, the same causing the end 64 to engage the pin 65 and consequently cause the yoke 24 to be moved to the right so as to place the gear 13 in mesh with the gear 21 and thus connect the shaft 19 to the shaft 18 for reverse movement.

What is claimed is:

1. In a speed change mechanism, a shaft, a plurality of members slidable thereon, operating members connected individually to the sliding members, means for operating the operating members selectively, catches for holding the respective operating members when they are operated, and means for operating all of the catches simultaneously.

2. A speed change mechanism embodying a plurality of individually movable members, means for operating each of said members, separate means for locking each of said means when the same is operated, and means for operating all of the locking means simultaneously.

3. In a speed change mechanism, a plurality of individually movable members, a separate operating member connected to each of said movable members, a separate electromagnetically operated means for each of the operating members to actuate it, separate means for locking each of the operating members, and electromagnetically operated means for operating all of the locking means simultaneously.

4. In a speed change mechanism, a shaft, a plurality of members slidable thereon, operating members connected individually to said slidable members and each having an armature, an individual electromagnet coöperating with each armature, a separate catch for each operating member, a rod connecting all of the catches and having an armature connected thereto, an electromagnet coöperating with the last mentioned armature, and means for energizing all of the electromagnets selectively.

5. In a speed change mechanism, a plurality of movable members, levers connected individually thereto, means for operating the levers selectively, a separate catch for each lever to lock it in position when it is operated, and means for operating all of the catches simultaneously.

6. In a speed change mechanism, a shaft, a plurality of members slidable thereon, bell crank levers each having one arm connected to one of said members, armatures carried by the other arms of the levers, and electromagnets coöperating with said armatures.

7. In a speed change mechanism, a shaft, a plurality of members slidable thereon, bell crank levers each having one arm connected to one of said members, armatures carried by the other arms of said levers, electromagnets coöperating with said armatures and adapted to be energized selectively, catches engageable with the last mentioned arms of said levers, and means for operating all of the catches simultaneously.

In testimony that I claim the foregoing as my own, I have hereto affixed my signature in the presence of two witnesses.

MARY PIERSON MITCHELL.

Witnesses:
 STELLA E. RISINGER,
 HARRY L. RISINGER.